(12) United States Patent
Diesner et al.

(10) Patent No.: US 12,280,964 B2
(45) Date of Patent: Apr. 22, 2025

(54) METHOD AND DEVICE FOR GROUPING PACKAGES

(71) Applicant: KHS GMBH, Dortmund (DE)

(72) Inventors: Stefan Diesner, St. Leon-Rot (DE); Stefan Helfrich, Heppenheim (DE); Ralf Kretschmann, Monsheim (DE); Adil Kuscu, Worms (DE); Tobias Laubscher, Hochspeyer (DE); Christoph Wiesenack, Mainz (DE)

(73) Assignee: KHS GmbH, Dortmund (DE)

( * ) Notice: Subject to any disclaimer, the term of this patent is extended or adjusted under 35 U.S.C. 154(b) by 83 days.

(21) Appl. No.: 18/250,434

(22) PCT Filed: Oct. 25, 2021

(86) PCT No.: PCT/EP2021/079505
§ 371 (c)(1),
(2) Date: Apr. 25, 2023

(87) PCT Pub. No.: WO2022/090136
PCT Pub. Date: May 5, 2022

(65) Prior Publication Data
US 2023/0399180 A1 Dec. 14, 2023

(30) Foreign Application Priority Data
Oct. 26, 2020 (DE) ............. 10 2020 128 041.6

(51) Int. Cl.
*B65G 43/10* (2006.01)
*B65G 43/08* (2006.01)
(Continued)

(52) U.S. Cl.
CPC ............ *B65G 43/10* (2013.01); *B65G 43/08* (2013.01); *B65G 47/261* (2013.01); *B65G 47/31* (2013.01);
(Continued)

(58) Field of Classification Search
CPC ...... B65G 43/08; B65G 43/10; B65G 47/261; B65G 47/31; B65G 57/02
(Continued)

(56) References Cited

U.S. PATENT DOCUMENTS 5,979,636 A 11/1999 Vanacore et al.
6,763,931 B1 7/2004 Brehm
(Continued)

FOREIGN PATENT DOCUMENTS

DE 102004038135 A1 3/2005
DE 102004035821 A1 2/2006
(Continued)

*Primary Examiner* — James R Bidwell
(74) *Attorney, Agent, or Firm* — Laurence A. Greenberg; Werner H. Stemer; Ralph E. Locher

(57) ABSTRACT

A method and device for grouping packages into specified package groups in an interference-free and fault-free manner with a conveyor having multiple individually actuatable conveyors arranged one behind the other with an inlet-side and a discharge-side end. The packages are supplied to the conveyor device at the inlet-side end one after the other, and a control algorithm is carried out to interpolate and/or detect the position and/or the speed of each individual package. A target speed is determined for each individual package based on the detected and/or interpolated position and/or speed of the package. A target speed is determined for the individual conveyors to achieve the target speed for each package to set a specified distance to the leading and/or following package at the discharge-side end. The speed of the individual conveyors is controlled to the respective determined target speed for the conveyor.

18 Claims, 6 Drawing Sheets

(51) Int. Cl.
  *B65G 47/26* (2006.01)
  *B65G 47/31* (2006.01)
  *B65G 57/02* (2006.01)
(52) U.S. Cl.
  CPC ...... *B65G 57/02* (2013.01); *B65G 2201/0235* (2013.01); *B65G 2203/0233* (2013.01); *B65G 2203/025* (2013.01); *B65G 2203/0291* (2013.01)
(58) Field of Classification Search
  USPC ...................................................... 198/460.1
  See application file for complete search history.

(56) References Cited

U.S. PATENT DOCUMENTS

| | | | |
|---|---|---|---|
| 7,542,823 B2 | 6/2009 | Nagai | |
| 8,028,817 B2 | 10/2011 | Itoh et al. | |
| 8,042,677 B2 | 10/2011 | Koenig et al. | |
| 8,408,380 B2 | 4/2013 | Doane | |
| 9,845,202 B2 | 12/2017 | Becker et al. | |
| 10,442,638 B2 | 10/2019 | Kollmuss et al. | |
| 2004/0112713 A1 | 6/2004 | Haan et al. | |
| 2014/0213768 A1* | 7/2014 | Wu | A61P 1/16 530/387.3 |
| 2014/0277698 A1* | 9/2014 | Combs | G05B 19/4189 198/460.1 |
| 2015/0336748 A1* | 11/2015 | Neiser | B65G 21/14 198/460.2 |
| 2022/0089378 A1 | 3/2022 | Schoenbauer et al. | |

FOREIGN PATENT DOCUMENTS

| | | | |
|---|---|---|---|
| DE | 102009050328 A1 | 4/2010 | |
| DE | 102014223319 A1 | 5/2016 | |
| WO | WO-03104115 A1 * | 12/2003 | ............. B65G 43/08 |
| WO | 2020163888 A1 | 8/2020 | |

* cited by examiner

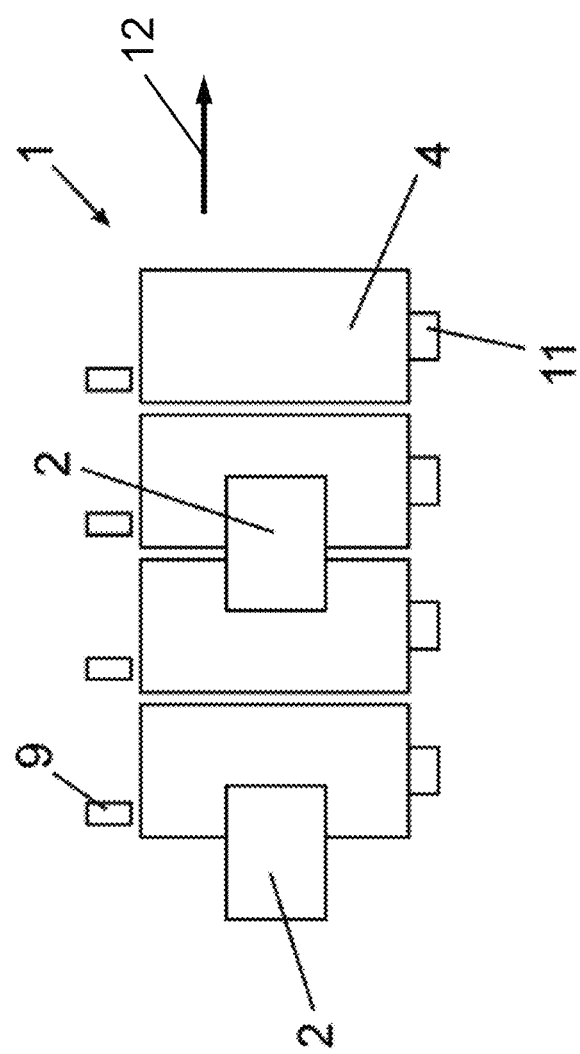

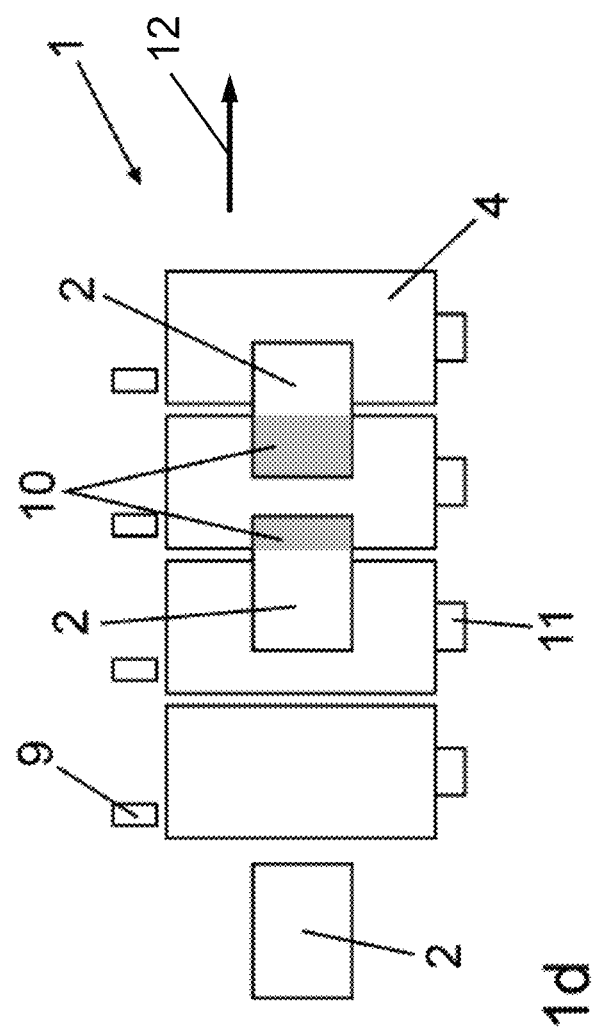

METHOD AND DEVICE FOR GROUPING PACKAGES

FIELD AND BACKGROUND OF THE INVENTION

The invention relates to a method and a device for grouping packages into specified package groups. The invention further relates to a control device for a device for grouping packages and a computer program for such a control device. The invention additionally relates to a palletising device with such a device for the grouping of packages, and a palletising method.

In general, methods and devices for the grouping of packages in a wide variety of configurations from the prior art, and are used in order to assemble individual packages or packages being conveyed one after another to the device into predefined package groups, for example in order to be able subsequently to palletise them.

With the methods and devices from the prior art, this usually takes place by closing gaps between the individual packages. In this situation, these gaps between the packages of a grouping and/or handling zone are forced closed by the accumulation of packages following one another. The accumulated packages are then, as required, transported away individually or in groups. When the packages accumulate, an accumulation pressure is imposed between the packages, wherein a lateral break-out of the accumulated packages, induced by the accumulation pressure, is typically prevented by guide railings. For this purpose, as a rule, individual guide railings are provided for each accumulated package row, in order to ensure secure guidance for the accumulated packages.

These methods and associated devices from the prior art for the grouping of packages to form package groups do however have numerous disadvantages. First, when accumulating, the packages, in particular packages accumulating in increasing numbers and increasing accumulation pressure, are pushed undesirably into the grouping and/or handling zone, and/or their allocation or grouping are disrupted, such that a subsequent palletising of predefined package groups is no longer possible free of disruption. In addition, the increasing accumulation pressure regularly leads to a situation in which the packages or the containers being assembled into packages become damaged.

The guide railings also incur disadvantages, wherein manually adjustable railings are associated with a considerable amount of effort at a change of format of the packages, and high investment costs, while automatically adjustable railings incur high maintenance effort and expenditure and are likewise associated with high investment costs. Finally, the contact between the packages and the railings, in particular as the accumulation pressure increases, leads to damage of the packages or of the containers forming the packages, which can lead to disadvantageous losses of production.

SUMMARY OF THE INVENTION

The invention is based on the object of allowing for the grouping of packages to form predefined package groups free of disruption and stoppages, which can preferably be achieved simply and economically in respect of both the device and/or the method.

This object is solved according to the invention by a method for the grouping of packages, a device for the grouping of packages, a control device for such a device, a computer program for such a control device, and a palletising device with a device according to the invention for the grouping of packages. Further advantageous embodiments of the invention are also described.

The method according to the invention for the grouping of packages to form a predefined package group is carried out by means of a conveying device, formed from multiple individually controllable conveyors arranged behind one another, with an inlet-side end and a discharge-side end, wherein, with the method according to the invention, the packages are first delivered to the conveying device at its inlet-side end, one after another, and, as long as at least one package of the package group which is to be formed is located on the conveying device, a control algorithm is carried out. According to the invention, the control algorithm comprises, as method steps, an interpolation and/or a detection of the position and/or of the speed of each individual package on the conveying device, a determination of a target speed of each individual package on the conveying device as a dependency of the detected or interpolated position and/or speed of the packages in order to form the predefined package group, a determination of a target speed of the individual conveyors in order to attain the target speed of the respective package in order to adjust a predefined distance spacing to the preceding and/or following package at the discharge-side end of the conveying device, and a controlling of the speed of the individual conveyors to the respective determined target speed of the conveyor in order to form grouping of the packages to the predefined package group free of accumulation pressure.

With the palletising method according to the invention for the palletising of packages, the packages are grouped to form predefined package groups, then, from the package groups, in a grouping and handling zone of a palletising device, package layers are formed which can be palletised and the package layers are then stacked above one another by means of a palletiser of the palletising device. In this situation, the packages are grouped in accordance with the method according to the invention described heretofore for the grouping of packages, or in accordance with one of its further embodiments described hereinafter.

The device according to the invention for the grouping of packages to form a predefined package group comprises a conveying device formed from a multiplicity of individually controllable conveyors arranged behind one another, with an inlet-side end and a discharge-side end, and a control device for the individual controlling of the conveyors for the grouping of the packages free of accumulation pressure, wherein the control device is configured such as to carry out a control algorithm, with which the position and/or the speed of the packages on the conveying device are interpolated and/or detected, a target speed of each individual package on the conveying device is determined as a dependency of the position and/or speed of the package, detected and/or interpolated, in order to form a predefined package group, and a target speed of the individual conveyors in order to attain the target speed of the respective package in order to set a predefined distance spacing to the preceding and/or following package at the discharge-side end of the conveying device, and the speed of the individual conveyors is controlled to the respective determined target speed of the conveyor for the grouping of the packages to form the predefined group, free of accumulation pressure.

The invention further relates to a control device for a device for the grouping of packages, in particular for a device according to the invention for the grouping of packages, wherein the control device is configured such as to control the device for the grouping of packages in such a way that this will allow for a method according to the invention to be carried out, or carry it out.

The present invention further comprises a computer program for the control device of a device according to the invention for the grouping of packages, which causes the device for the grouping of packages to carry out a method according to the invention when the computer program is run on the control device.

Finally, the invention also relates to a palletising device with a palletiser for the stacking of packages, a grouping and handling zone upstream of the palletiser, for positioning the packages in an arrangement required for stacking, and a device according to the invention for the grouping of packages for the delivery of packages to the grouping and handling zone.

The inventors have recognised that a grouping of packages free of accumulation pressure has numerous advantages, and, in particular, makes it possible for particularly precise and reliably predefined package groups to be formed, wherein the method runs particularly free of interruption and breakdown. As well as this, the avoidance of a build-up of an accumulation pressure during the grouping leads to the effective avoidance of damage to the packages and to the containers assembled to form the package. In addition to this, there is the advantageous possibility of doing away with guide railings, which on the one hand leads to a saving of costs and, on the other, to perceptibly reduced expenditure of work and time at a change of format of the packages which are to be grouped, and therefore reduces overall production and operating costs. Even if railings are optionally used, for example in order to prevent a rotation of the packages at the transition points between the individual conveyors, the contact pressure of the package with the railings is perceptibly reduced, such that the risk of damage or disruption is substantially reduced.

A package is in principle formed of a multiplicity of containers, preferably identical to one another, in a specified arrangement of containers to one another, wherein the containers are for particular preference arranged in the package entirely fixed in position in relation to one another. In this situation, the individual containers of a package can be connected to one another in any desired manner and/or secured in common. For example, the containers can be secured to one another by means of one or more adhesive connections in each case between two adjacent containers. As an alternative or in addition, the package can also be held together by a film, a strip, a band, and/or a common label. For further preference, all the packages to be grouped are formed as identical to one another and/or comprise an identical number of containers. The containers can in this case exhibit any desired shape and size, be formed from any desired material, and be provided for any desired contents. For preference the containers are bottles, cans, or cartons. Likewise for preference, the containers are formed from plastic, glass, sheet metal, aluminium, and/or a composite material, in particular a composite card. Preferably, the containers are provided for foodstuffs, particularly preferably for liquid foodstuffs, and for very particular preference for beverages.

In principle, the grouping of packages is understood to be an assembling and/or individual formation of individual packages or grouped packages, as may be required, such that all the packages of a package group exhibit defined spacing intervals to one another after the grouping. These spacing intervals can be of equal size inside a package group, or may differ from one another. In addition, one or more of the spacing intervals can even be zero. The grouping can also comprise a buffering of individual packages or groups of packages, wherein a buffering can take place in particular by the closing of gaps.

In general, the grouping can produce a defined package group, i.e. a package group, which exhibits a predefined shape. The shape can in this situation be derived from the spacing interval of the individual packages to one another along the transport direction of the conveying device and/or at right angles to it. In this situation a defined package group can in principle be a single row, such that all the packages following one another can stand or be transported exactly flush to one another. In addition to this, however, it is also conceivable that at least two packages of a predefined package group are pushed towards one another at right angles to the transport device and/or are even arranged next to one another. The aim of the grouping, however, is preferably the formation of layers of packages which are to be palletised or the formation of rows of packages for the subsequent formation of layers which are to be palletised from one or more package rows. In this situation, an alignment of package rows takes place for particular preference in a grouping or handling zone and/or by rotation and/or displacement of the packages or package rows. As well as the grouping of packages, the method can also be applied to individual containers, such that individual containers can then be grouped to form a predefined group, in particular in order subsequently to form a package from this.

According to the invention, for the grouping of packages a conveying device is provided, which can move the packages which are to be grouped in at least one spatial direction, preferably in linear fashion in precisely one transport direction. In this situation, the conveying device can be configured as of one track or multiple tracks. A multiple track conveying device can be formed in particular with a multiple track package inlet or with several separated package inlets. In addition, a multiple track conveying device is preferred with which each individual track can be controlled or regulated independently. Preferably, the packages are transported standing upright on the conveying device.

The conveying device is in general formed from several conveyors, which in each case can be individually controlled and are arranged one behind another. In this situation, each conveyor is configured for the transport of at least one package, wherein the transport preferably takes place standing upright on the conveyor and/or along a linear transport direction. For this purpose the conveyor can in principle be configured in any desired form, wherein a mat chain conveyor is preferred. Preferably, each conveyor comprises precisely one circulating conveyor means, in particular precisely one conveyor belt. For further preference, several conveyors, and for particular preference all the conveyors, of the conveying device are formed as identical to one another, and/or exhibit identical dimensions of the conveyor or of the conveying means, in particular an identical length in the transport direction and/or an identical width transverse to the transport direction. Preferably, the conveying device comprises at least three conveyors, for particular preference between three and six conveyors, and for very particular preference exactly four conveyors. In order to form a common conveying device, the conveyors are arranged behind one another in such a way that a package can be transferred from one conveyor in each case onto the following conveyor, wherein preferably a continuous transport of the package in the transport direction is possible. For particular preference, the individual conveyors are arranged immediately adjacent to one another.

In order to allow for a grouping of packages by means of the individual conveyors of the conveyor device, according to the invention the conveyors can be individually controlled. In this situation, each conveyor preferably comprises a drive means, in particular a motor, for a conveying means. The motor is preferably electrically driven and/or configured as a servomotor. In addition, each motor of the conveyor device can preferably be individually controlled.

The device according to the invention for the grouping of packages comprises a control device, which is provided for carrying out a control algorithm, and control software for carrying out this control algorithm. In this situation, the control device can be arranged both directly at the device for the grouping of packages, as well as being a part of an external and/or superordinated machine or process control system. The control algorithm in this situation carries out a series of steps, preferably at least for as long as until the complete predefined package group is formed and/or as long as packages are located on the conveying device. For this purpose, the control algorithm preferably runs continuously and/or the individual steps run repeatedly. In this situation, a continuous repetition of the individual process steps can comprise, also an uninterrupted sequence of the individual process steps, and also a sequence with a temporal pause between one of the several method steps and/or between the individual repetitions of a series of method steps. Preferably, the control algorithm comprises the individual steps in the sequence of an interpolation and/or detection of the position and/or of the speed, followed by a determination of a target speed of each individual package, and then a determination of a target speed of the individual conveyors, and then, finally, the controlling of the speed of the individual conveyors to the specified target speed in each case.

The interpolation and/or detection of the position and/or of the speed of the package can in principle take place in any desired manner, wherein the interpolation takes place preferably by means of the position and/or speed of the package determined beforehand and/or of the respective conveyor. In order to detect the position and/or the speed, preferably at least one sensor device is provided, arranged next to and/or upstream of the conveyor device. The sensor device can detect the position and/or the speed in any desired manner, such as optical. For this purpose, the sensor device can comprise a light beam, in particular a laser beam, or a camera or another optical and/or imaging sensor. A possible sensor device is, for example, a light barrier. As an alternative, however, detection can also be carried out by means of one or more 3D sensors. Preferably, at least one sensor device is arranged in the region of the conveyor device. For further preference, a sensor device is also arranged upstream of the first conveyor. As an alternative or in addition, a sensor device can also be arranged in front of and/or behind at least one conveyor, preferably several conveyors, and for particular preference all the conveyors.

As a further step of the control algorithm, the target speed of the respective package is determined on the conveying device for forming the predefined package group, for which purpose it is determined whether the package is located at the discharge-side end in the transport direction of the conveyor device before, behind, or on the predefined position of the package group which is to be formed. In order to be able to carry out a position adjustment of the respective package in relation to the preceding package and/or the following package, and in relation to the discharge-side end of the conveyor device, the target speed of the individual conveyors for the respective package is determined, and then controlled in such a way that, at the latest at the discharge-side end of the conveyor device, the predefined spacing interval to the preceding and/or following package of the predefined package group is attained.

With one advantageous further embodiment of the method according to the invention, in order to achieve the grouping of the packages free of accumulation pressure, the speed of the individual conveyors is controlled in such a way that at least occasionally a slip is deliberately produced between a package on the conveyor device and a conveyor, as a result of which, in a simple manner, a speed difference can be created between the conveyor speed and the package speed. In this situation, in particular, the slip of the package preferably takes place in the transfer region between two conveyors. In order to achieve this, all the conveyors can preferably be controlled or regulated steplessly, as a result of which any desired speed differences can be produced.

A preferred embodiment of the method according to the invention for the grouping of packages makes provision that, during the performance of the control algorithm, the position and/or the speed of all the packages of the package group which is to be formed, and which are present on the conveyor device, are detected by means of at least one sensor device on the entire conveyor device, as a result of which an ongoing adjustment of the package spacing intervals and/or speeds is possible, and therefore the predefined package can be formed in a particularly reliable and precise manner. Continuous detection is understood in this situation to mean a repeated detection in at least one time interval, which is preferably shorter than the dwell time of each package on the respective conveyor. For particular preference, however, the detection takes place by means of a camera and/or with at least one detection per second, for very particular preference with more than 5 detections per second, and for greatest preference at more than 10 detections per second.

While the control algorithm according to the invention only makes provision for a controlling of the speed of the individual conveyors, with one preferred further embodiment of this method the actual speed of the individual conveyors is regulated to the target speed of the conveyor determined in each case, by means of the detected position and/or speed of the package, such that a particularly exact adjustment of the actual speed of the respective package to the target speed is possible, and therefore a particularly precise positioning of the package for the exact achievement of the predefined package group is possible.

The grouping of the individual packages on the conveyor device and/or at the discharge-side end of the conveyor device can in principle take place in any desired manner, wherein the package of a predefined group can exhibit both a distance spacing between one another as well as being in contact with one another.

In one advantageous embodiment of the method according to the invention, at the grouping the packages are assembled in such a way that adjacent packages are in contact with one another, but for particular preference, at the same time, no accumulation pressure takes place between the packages or is incurred due to packages following one another. In other words, in this advantageous embodiment variant the packages of the package group are grouped to one another without any gaps, but preferably also without the packages of the package group being accumulated.

In principle, the determination of the target speed of each individual package can take place in any desired manner, wherein preferably it is first determined whether the respective package is a leading or non-leading package of the package group which is to be formed. As a dependency of this, it is then further preferred that, following this, with a leading package the time is determined which the package should need in order to reach the discharge-side end of the conveyor device or, respectively, to reach the start of a grouping and handling zone. This can also take place in particular as a dependency of a spacing interval to a preceding package group and/or the speed of following handling processes, such as alignment and/or palletising. With a non-leading package, likewise for preference, the target speed is initially adjusted to the maximum possible speed, in particular until a braking path of the package is greater than or equal to the current spacing interval to the preceding package. In particular, with a non-leading package, the remaining gap can then be closed by means of a regulating process, such that the package is brought up to a predefined spacing interval to the preceding package.

In order to determine the time which a leading package should require in order to reach the discharge-side end of the conveyor device, preferably account is taken of the anticipated package throughput at the delivery of the packages to the conveyor device, and, deriving from this, the point of time of the running in of the last package of the package group which is to be formed and/or a desired spacing interval to the preceding package group, whether still located on the conveyor device or having already completely run through the conveyor device. In particular with a multi-track device for the grouping of packages, or with a multi-track conveyor device, account is further preferably taken also of stops of the package or package group on the conveyor device, in order to allow for the handling of the respective package group in a following grouping and handling zone without interruption. The expected package throughput can in this situation be determined, for example, statistically and/or calculated on the basis of anticipated values and/or measured at a position preceding the conveyor device or a processing station of the package.

At the determination of the target speed of each individual package, numerous factors can be taken into account for the improvement of the method according to the invention, which could derive from the packages which are to be grouped, the containers of the package, and/or the device for the grouping. In particular, maximum permissible acceleration and/or deceleration values of the conveyor devices and/or the packages can be taken into account, wherein the maximum permissible values of the packages are dependent in particular on the friction value of the package on the respective conveyor, and/or on the dimensions and the position of the centre of gravity of the package. As well as this, consideration can also be given to the orientation of the package on the respective conveyor, the dimensions of the contact surface of the package on the respective container, and/or the speed of the preceding and/or following conveyor of the conveyor device.

An advantageous further embodiment of the method according to the invention also makes provision that, for the determination of the target speed of the individual conveyors, it is first determined in each case whether only one package or several packages are located on the respective conveyor, and, following this, if only one single package is on the conveyor, the target speed of the conveyor is adjusted to the target speed of the package, and, if there are more than one packages on the conveyor, in particular if there are precisely two packages on the conveyor, only in sections, the target speed of the conveyor is adjusted as a dependency of the conditions of the contact surfaces of the respective package with the conveyor, wherein the target speed of the conveyor is adjusted to the target speed of the package currently running, until the contact surface of the currently running package with the conveyor falls below a predetermined limit value. In this way, a particularly closely monitored controlling of the individual conveyors can be produced, in order to incur a slip of the respective package in the transition region between two conveyors, such that the spacing interval of a package located on the respective conveyor and a second package which is only located in sections on the same conveyor can be adjusted in a simple manner. It is further preferred that, in the event of the specified limit value being fallen short of the contact surface of the present package, the contact surfaces of the preceding and following package are compared, and the target speed of the conveyor is adjusted to the target speed of the package with the larger contact surface.

In this situation, the contact surface of the respective package with the conveyor is both directly measured or determined, or calculated from the measured or interpolated position of the package on the conveyor. Correspondingly, an advantageous embodiment of the device according to the invention comprises at least one device for determining the contact surfaces of the packages on the individual conveyors, wherein the device for determining the contact surfaces is preferably a part of a sensor device for determining the position and/or the speed of each package. For particular preference, at each conveyor and/or in the transition region between two conveyors a device is provided for determining the contact surface. For particular preference, the determination of the contact surface is effected by means of at least one optical sensor, and for very particular preference by means of a camera. A direct measurement of the contact surface can be effected, for example, with the aid of an image recognition procedure, in particular by the recognition of the contours of the package in optical images. However, as an alternative for the determination of the contact surface, the spacing interval of the package at the start and at the end of the respective conveyor can be measured.

According to one preferred embodiment of the method according to the invention for the grouping of packages, for the determination of a target speed of the individual conveyors it is first determined whether there is no package present on the respective conveyor, and, if there is no package on the respective conveyor, the target speed of the conveyor is adjusted to the target speed of the package which is expected to run in next. In the event of no package being expected to run in next, the target speed of the conveyor is likewise adjusted to the target speed of the preceding conveyor, such that, on the one hand, an unimpeded transport of a leading package is possible, and, on the other, particularly rapidly, the speed of the conveyor can be adjusted in order to accelerate or decelerate a package.

Although in principle all the conveyors of the conveyor device can be formed in any desired manner, a configuration is preferred of the device according to the invention for the grouping of packages in which all the conveyors exhibit the same length in the conveying direction, such that a unitary control of all the conveyors of the same length is possible, and, in addition, the conveyor device can be particularly easily adjusted in length by the adding or removal of further conveyors. In addition or as an alternative, the length of the conveyors in the conveying direction preferably corresponds approximately to the length of a package, as a result of which the device for the grouping of packages exhibits a particularly compact form. Likewise for preference, the length of a conveyor amounts to between 10 cm and 100 cm, preferably between 20 cm and 50 cm, and for particular preference to approximately 30 cm. As well as a configuration with conveyors with a fixed length, the use of one or more conveyors of the conveyor device with a variable length is also possible. As well as this, a conveyor of the conveyor device can also be formed by the functional interconnecting of several shorter conveyor units, which for particular preference run in functional terms always run as a single conveyor, at the same speed, wherein the length of the conveyor can then be lengthened or shortened respectively by the adding or removing of individual conveyor units. It is further preferred that each conveyor extends with its width over the total width of the conveyor device and/or comprises precisely one conveyor element, for example one mat chain per conveyor.

Finally, a configuration of a device according to the invention is preferred with which a conveyor of the conveyor device is formed without railings and/or lateral guides, wherein for particular preference the entire conveyor device is formed without railings and/or lateral guides, as a result of which particularly economical production is possible, as well as a particularly rapid format change of the package which is to be grouped.

Two exemplary embodiments of the device according to the invention and of the method according to the invention for the grouping of packages are explained in greater detail hereinafter by reference to the drawings. These show:

DETAILED DESCRIPTION OF THE INVENTION

Figure 1A:
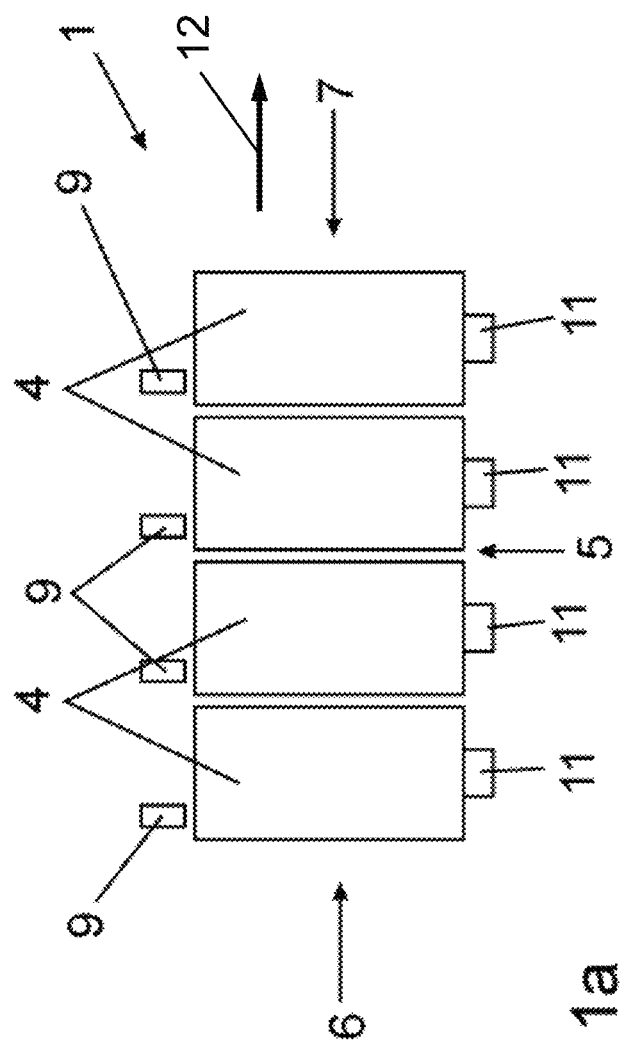
FIG. 1a A schematic view of a device for the grouping of packages with a single-track conveyor device, FIG. 1b a schematic view of the device represented in FIG. 1a for grouping, with a first package, FIG. 1c a schematic view of the device represented in FIG. 1a for grouping, with a second package running in, FIG. 1d a schematic view of the device represented in FIG. 1a for grouping, with two packages on a conveyor, FIG. 1e a schematic view of the device represented in FIG. 1a for grouping, with a package group of three packages, and FIG. 2 a schematic view of the device represented in FIG. 1a for the grouping of packages, with a two-track conveyor device.

The first embodiment of a device 1, represented in FIGS. 1a-1e, for the grouping of packages 2, is formed from four identical mat chain conveyors 4, arranged behind one another, which together form a conveyor device 5. Each of the mat chain conveyors comprises a servomotor 11, and can be controlled individually. The length of each mat chain conveyor 4 lies in the order of size of the dimensions of a package, and amounts to approx. 30 cm, such that the entire conveyor device 5 exhibits a length in the transport direction of some 120 cm. The entire conveyor device 5 is formed in this situation without railings or lateral guides.

The device 1 for the grouping of packages further comprises several sensors 9, for detecting the position and/or speed of the individual packages 2, which can be formed in each case, for example, by a camera. An embodiment is preferred, however, in which a light barrier is arranged in the transport direction 12 at the beginning of each mat chain conveyor 4, in such a way that the beginning and end of packages 2 which are being transported can be detected, as a result of which the position of the package 2 can be measured, and from which the speed of the package 2 can be calculated (see FIG. 1a). In addition, the contact surface 10 of each package 2 with the mat chain conveyor 4 can be easily and precisely calculated on the basis of the detected position and speed.

Figure 2:
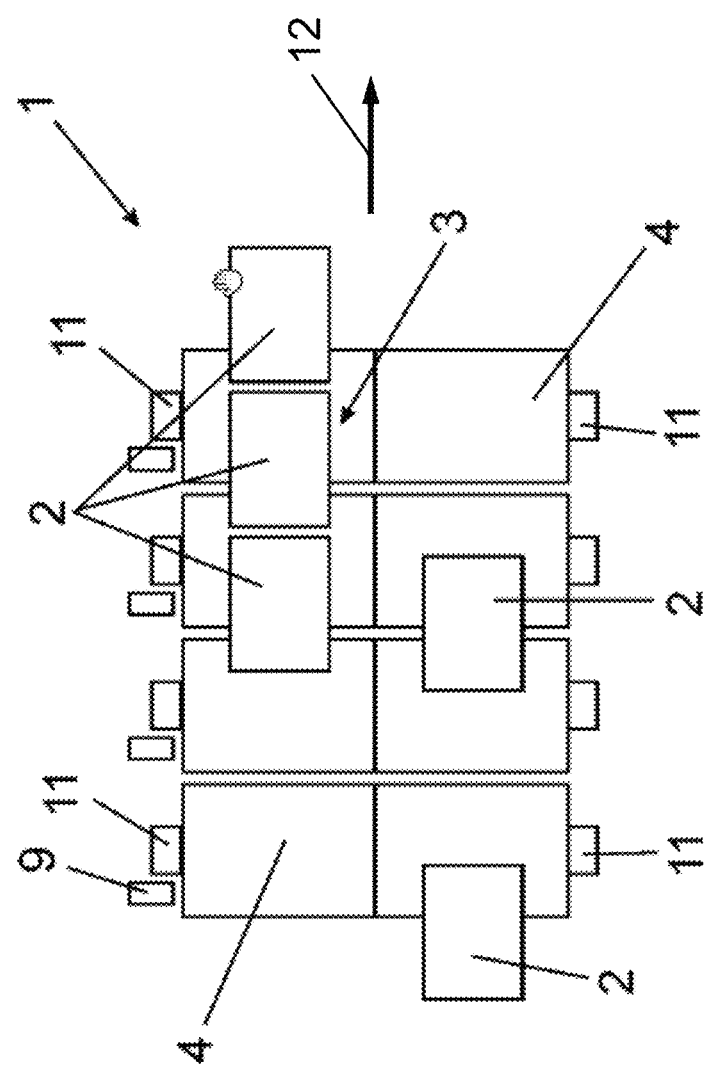

In addition, the device 1 for the grouping of packages 2 comprises a control device (not represented), in order to be able to control a method for the grouping of the packages 2 to form a predefined package group 3. A further embodiment represented in FIG. 2 of a device 1 for the grouping of packages 2 differs from the first embodiment specifically in that the mat chain conveyors 4 are in each configured with two tracks, wherein these comprise two mat chains, next to one another and which can be controlled independently of one another, such that two-row package groups can also be formed. In principle, it is also possible to make use of conveyors with three or more transport tracks. With such conveyors 4 formed with two or more tracks, the individual tracks can be interconnected, i.e. operated at the same conveying speed, in particular as a dependency of the package dimensions transverse to the transport direction 12, and/or the number of packages pre-grouped transverse to the transport direction 12.

The control of the device 1 for the grouping of packages 2 is effected by way of a control algorithm, which is put into effect as soon as a package 2 is present on the conveyor device 5, and for as long as further packages 2 are being delivered at the inlet-side end 6 of the conveyor device 5. In this situation a series of steps are run through continuously and uninterruptedly one after another. First the position and the speed of each package 2 on the conveyor device 5 is detected, then a target speed is determined of the package 2 for forming the predefined package group 3, then the target speed necessary of the respective mat chain conveyor 4 is determined, and finally the actual speed of the respective mat chain conveyor 4 is regulated to the desired target speed, wherein the positions and speeds detected are used for the regulating procedure. One particular problem with this method arises from the fact that it is possible for more than one package 2 to be present on the conveyor device 5 at the same time, and in that case a matching and adjustment procedure is necessary inside the conveying device 5.

Figure 1B:
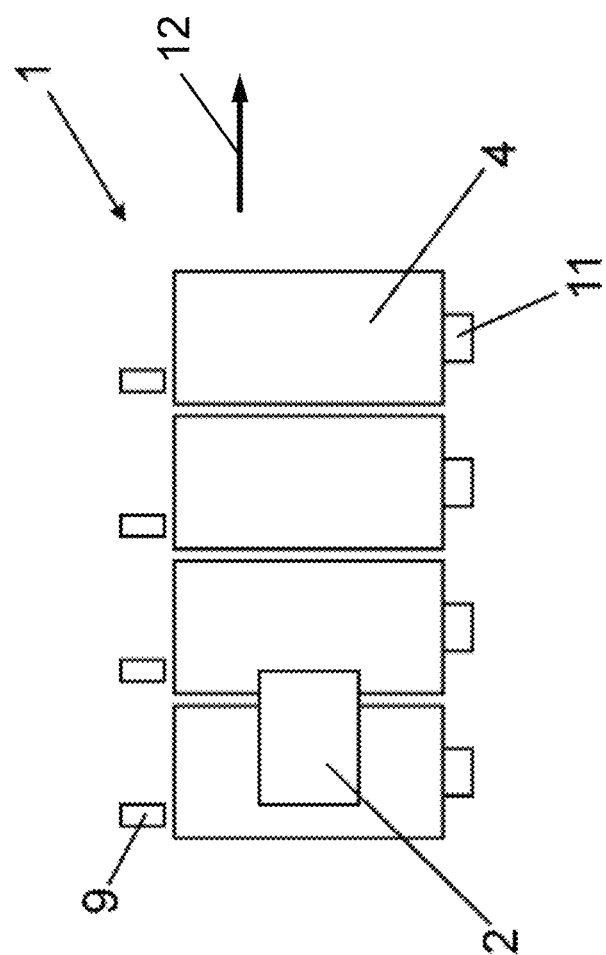

In detail, a detection of the position always takes place when a package 2 enters into one of the light barriers or moves out of it (see FIG. 1b). From the time difference and the known package dimensions it is then possible for the respective speed to be determined. As a supplement to this, information from at least one camera can also be used.

At the determination of the target speed of each package 2, it is first determined by the control device whether the respective package 2 is the first package 2 of a package group 3 which is to be formed, i.e. a leading package 2. If this is the case, the time is determined in which this package 2 is intended to reach the end of the conveyor device 5, wherein this time can be dependent, for example, on the feed rate of the packages 2 to the conveyor device 5, the speed of the following processing steps of the package group 3, and/or the desired spacing interval to the preceding group, at least in sections, of the package group 3 which is present on the conveyor device 5 or which has already run completely through the conveyor device 5.

Conversely, if the respective package 2 is not a leading package 2 (see FIG. 1c), then the target speed is first set to the maximum speed, wherein it is in principle checked whether the preceding package being transported is being transported at a lower speed than the maximum possible speed. If this is the case, then the target speed of the following non-leading package 2 is reduced as soon as the braking path of this package 2 to match the speed of the preceding package is equal to the sum of the present spacing interval to the preceding package 2, and equal to the desired spacing interval 8 between the two packages 2 in the package group 3. If no spacing interval is desired between the two packages 2 in the package group 3, then the target speed is reduced as soon as the braking path is equal to the present spacing interval of this package 2 from the preceding package 2.

The maximum possible speed of a package 2 depends in this situation on numerous factors, in particular on the maximum possible acceleration and/or deceleration, which in turn depends, among other factors, on the location of the centre of gravity of the package 2 in relation to the surface of the conveyor device 5, the weight of the package 2, and/or the friction value on the surface of the conveyor device 5.

In order to determine the target speed of each mat chain conveyor 4, a check is first made on whether, at least in sections, no package 2, one package 2, or two packages 2 are present on the respective mat chain conveyor 4. If there is no package 2 on the mat chain conveyor 4, then the target speed of the conveyor is already set to the target speed of the next package 2 which is expected to run in. If there is only one single package 2 on the respective mat chain conveyor 4 (see FIG. 1*c*), then the target speed of the mat chain conveyor 4 is set to the target speed of the respective package 2.

Conversely, if more than one package 2 is present on the respective mat chain conveyor 4 (see FIG. 1*d*), then the contact surfaces 10 of both packages 2 are set in relation to the surface of the mat chain conveyor 4, and then, as soon as the contact surface 10 of the one package 2 on the mat chain conveyor 4 is greater by a predetermined factor than the contact surface 10 of the other package 2, the target speed of the mat chain conveyor 4 is adjusted to the target speed of the package 2 with the larger contact surface 10.

In practice, as long as there is first only one package 2 present on the mat chain conveyor 4, this leads to the situation in which the target speed is determined by this package 2. If a second package 2 then comes into the region of this mat chain conveyor 4, then its contact surface 10 increases, and, at the same time, the contact surface 10 of the first package 2 decreases, since the length of the mat chain conveyor 4 lies in the region of the length of a package 2. Up to this time, due to the speed differences, a slip may occur between the mat chain conveyor 4 and the second package 2. However, as soon as the contact surface 10 of the second package 2 is greater than that of the first package 2, then the target speed is determined by the second package 2, and, if necessary, the actual speed of the mat chain conveyor 4 is altered. As a result, due to the speed differences which occur, if appropriate a slip occurs between the first package 2 still present in sections on the mat chain conveyor 4 and this mat chain conveyor 4.

Figure 1E:
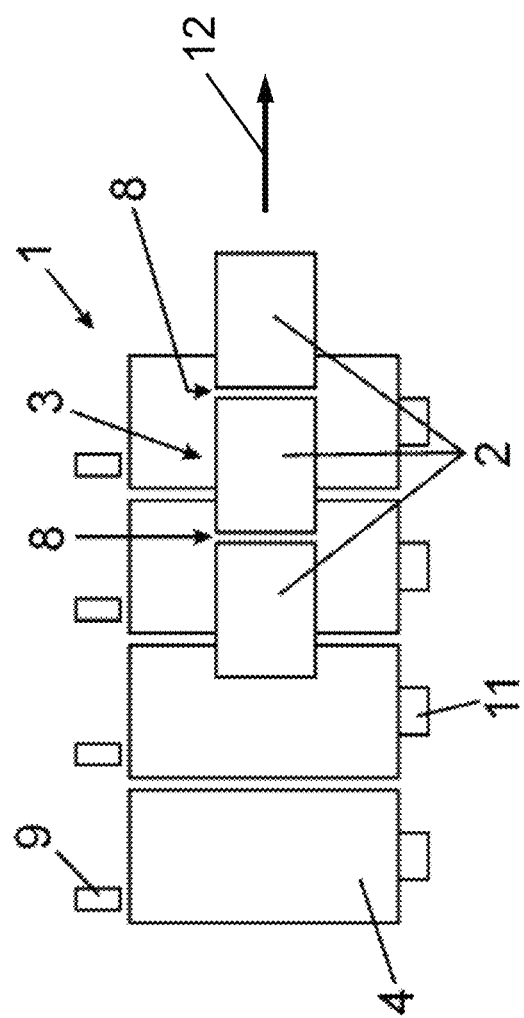

Due to the speed differences between the individual mat chain conveyors 4 of the conveyor device 5, and due to the deliberately induced slip between the mat chain conveyors 4 and the packages 2, the spacing intervals between the packages 2 of a package group 3 which is to be formed can be adjusted if required, until the predefined spacing interval 9 which is to be achieved has been reached between all the packages 2 (see FIG. 1*e*).

REFERENCE NUMBER LIST

1 Device for grouping packages
2 Package
3 Package group
4 Conveyor
5 Conveyor device
6 Intake-side end
7 Discharge-side end
8 Predefined spacing interval
9 Speed and position sensor device
10 Contact surface
11 Servomotor
12 Transport direction

The invention claimed is:

1. A method for grouping packages into a predefined package group, the method comprising
providing a conveyor device formed of a plurality conveyors, the conveyors being individually controllable, being arranged behind one another, and having an inlet-side end and a discharge-side end;
delivering the packages one after another to the conveyor device at its inlet-side end;
carrying out a control algorithm when at least one package of the package group which is to be formed is present on the conveyor device, the control algorithm comprising following steps:
interpolating and/or detecting the position and/or the speed of each individual package on the conveyor device;
determining a target speed for each individual package on the conveyor device dependent on the detected and/or interpolated position and/or speed of the package for forming the predefined package group;
determining a target speed of the individual conveyors for attaining the target speed of the respective package for adjusting a predefined spacing interval to the preceding and/or following package at the discharge-side end of the conveyor device; and
controlling the speed of the individual conveyors to the respective target speed of the conveyor which has been determined in each case, in order to achieve the grouping of the packages to the predefined package group without any accumulation pressure, and controlling the speed of the individual conveyors such that a slip is produced between a package and a conveyor to group the packages without accumulation pressure.

2. The method according to claim 1, wherein during the running of the control algorithm, the position and/or the speed of all the packages of the package group which is to be formed are detected by at least one sensor device on the entire conveyor device.

3. The method according to claim 2, further comprising regulating the speed of the individual conveyors based on the detected position and/or speed of the packages.

4. The method according to claim 1, wherein the packages are brought together during the grouping where adjacent packages touch one another.

5. The method according to claim 1, further comprising, in order to determine the target speed of each individual package, first determining whether the respective package is a leading or non-leading package of the package group which is to be formed; and
if the package is determined to be a leading package, the time is determined in which the package would require to reach the outlet-side end of the conveyor device, and
if the package is determined to be a non-leading package, the target speed is first adjusted to the maximum possible speed, until a braking path of the package is greater than or equal to the present spacing interval to the preceding package.

6. The method according to claim 5, further comprising determining the time in which a leading package would require to reach the outlet-side end of the conveyor device, based in part on:
the expected package throughput at the feeding of the packages to the conveyor device, and, deriving, the point of time at which the last package runs in, of the package group to be formed, and/or
a desired spacing interval to the preceding package group, still present on the conveyor device or which has already run completely through the conveyor device.

7. The method according to claim 1, further comprising determining the target speed of each individual package based at least in part on the maximum permissible acceleration and/or deceleration values, which are dependent on the friction value of the package on the respective conveyor and/or on the dimensions and the location of the center of gravity of the package.

8. The method according to claim 1, further comprising, for the determination of a target speed of the individual conveyors, determining whether only one single package or several packages are present on the respective conveyor; and
if there is only one single package on the conveyor, the target speed of the conveyor is adjusted to the target speed of the package, and
if there are more than one packages on the conveyor, the target speed of the conveyor is adjusted as a dependency of the conditions of the contact surfaces of the respective container with the conveyor, wherein the target speed of the conveyor is adjusted to the target speed of the preceding package until the contact surface of the preceding package with the conveyor falls below a predetermined limit value.

9. The method according to claim 8, wherein, when the predetermined limit value of the contact surface of the preceding package is undercut, the contact surfaces of the preceding and following packages are compared, and the target speed of the conveyor is adjusted to the target speed of the package with the larger contact surface.

10. The method according to claim 1, further comprising, for determining a target speed of the individual conveyors, first determining whether there is no package present on the respective conveyor, and if there is no package on the respective conveyor, adjusting the target speed of the conveyor to the target speed of the next package which is expected to run in, and/or if no next package is expected to run in, adjusting the target speed of the conveyor to the target speed of the preceding conveyor.

11. A method for palletizing packages, the method comprising:
performing the method according to claim 1 to form predefined package groups;
forming package layers from the package groups that are capable of palletizing in a grouping and handling zone of a palletizing device; and
stacking the package layers on top of one another by a palletizer of the palletizing device.

12. A device for grouping packages to form a predefined package group, comprising:
a conveyor device having a plurality of conveyors, said conveyors being individually controllable and arranged behind one another, with an inlet-side end and a discharge-side end;
a control device for the individual controlling of the conveyors for the grouping of the packages without any accumulation pressure, said control device being configured to carry out a control algorithm, with which the position and/or the speed of the packages on the conveyor device are interpolated and/or detected;
said control device being configured to:
determine a target speed of each individual package on the conveyor device based on detected and/or interpolated position and/or speed of the package for forming a predefined package group,
determine a target speed of the individual conveyors for attaining the target speed of the respective package, to adjust a predefined spacing interval to the preceding and/or following package at the discharge-side end of the conveyor device, and
control the speed of the individual conveyors to the respective determined target speed of the conveyor to achieve grouping of the packages to form the predefined package group without any accumulation pressure, and control the speed of the individual conveyors such that a slip is produced between a package and a conveyor to group the packages without accumulation pressure.

13. The device according to claim 12, further comprising a sensor device configured to determine the position and/or the speed of each package, and said sensor device being configured to determine the contact surfaces of the packages on the individual conveyors.

14. The device according to claim 12, wherein all the conveyors have the same length in a conveying direction.

15. The device according to any one of the preceding claim 12, wherein each conveyor extends in a width direction over the entire width of the conveyor device.

16. The device according to claim 12, wherein at least one conveyor of the conveyor device is formed without railings and/or lateral guides.

17. A computer program for the control device of the device according to claim 12, wherein the computer program is configured to operate the device to carry out a method for grouping packages into a predefined package group, the method comprising:
providing a conveyor device formed of a plurality of conveyors, the conveyors being individually controllable, being arranged behind one another, and having an inlet-side end and a discharge-side end;
delivering the packages one after another to the conveyor device at its inlet-side end;
carrying out a control algorithm when at least one package of the package group which is to be formed is present on the conveyor device, the control algorithm comprising following steps:
interpolating and/or detecting the position and/or the speed of each individual package on the conveyor device;
determining a target speed for each individual package on the conveyor device dependent on the detected and/or interpolated position and/or speed of the package for forming the predefined package group;
determining a target speed of the individual conveyors for attaining the target speed of the respective package for adjusting a predefined spacing interval to the preceding and/or following package at the discharge-side end of the conveyor device; and
controlling the speed of the individual conveyors to the respective target speed of the conveyor which has been determined in each case, in order to achieve the grouping of the packages to the predefined package group without any accumulation pressure.

18. A palletizing device, comprising:
a palletizer for stacking packages;
a grouping and handling zone upstream of the palletizer for positioning the packages in an arrangement required for the stacking; and
a device according to claim 12 configured to feed packages to the grouping and handling zone.

* * * * *